Aug. 29, 1950 L. D. TRELOAR 2,520,578
OVEN
Filed May 24, 1948 5 Sheets-Sheet 2
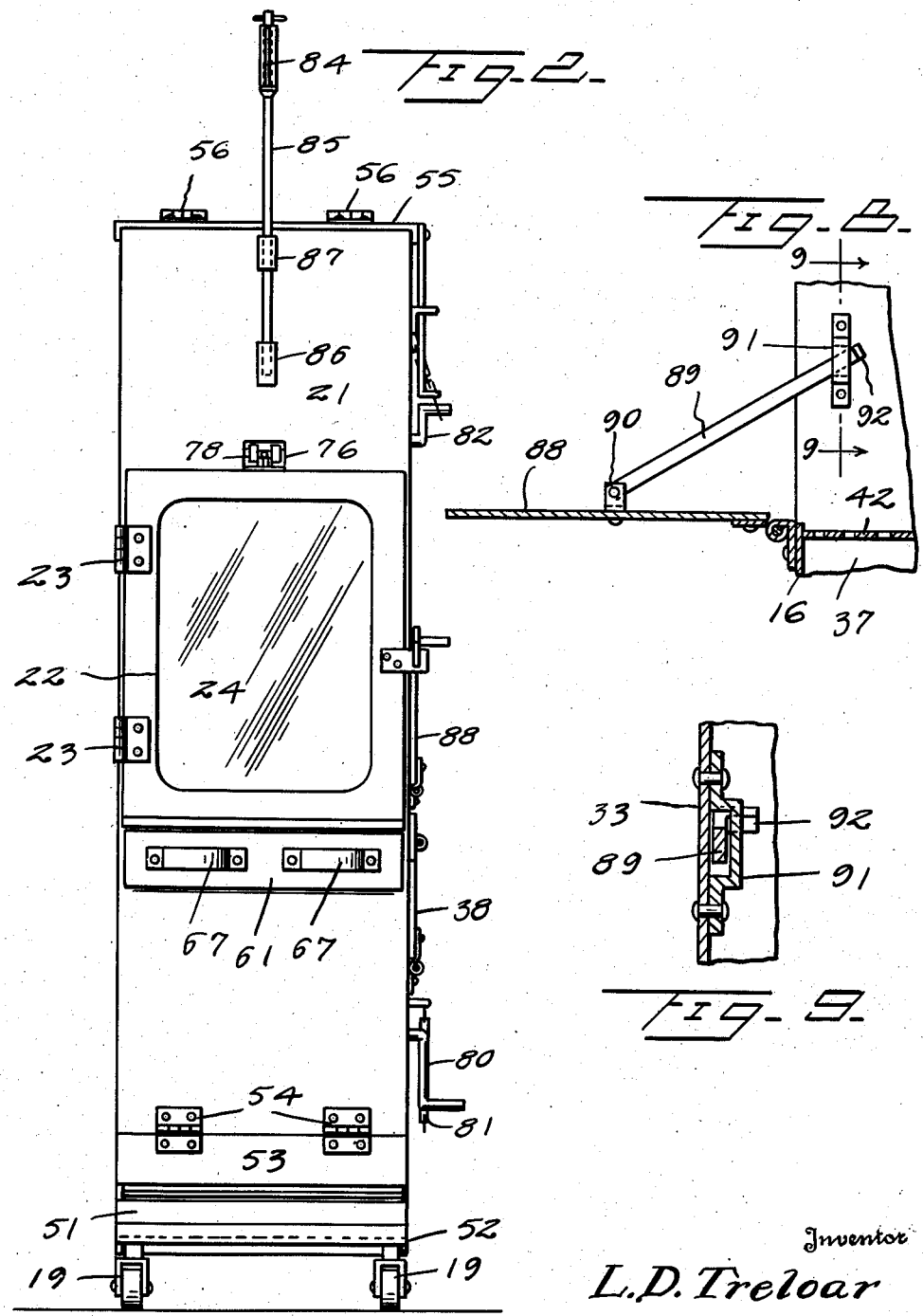
Inventor
L. D. Treloar
By Kimmel & Crowell
Attorneys

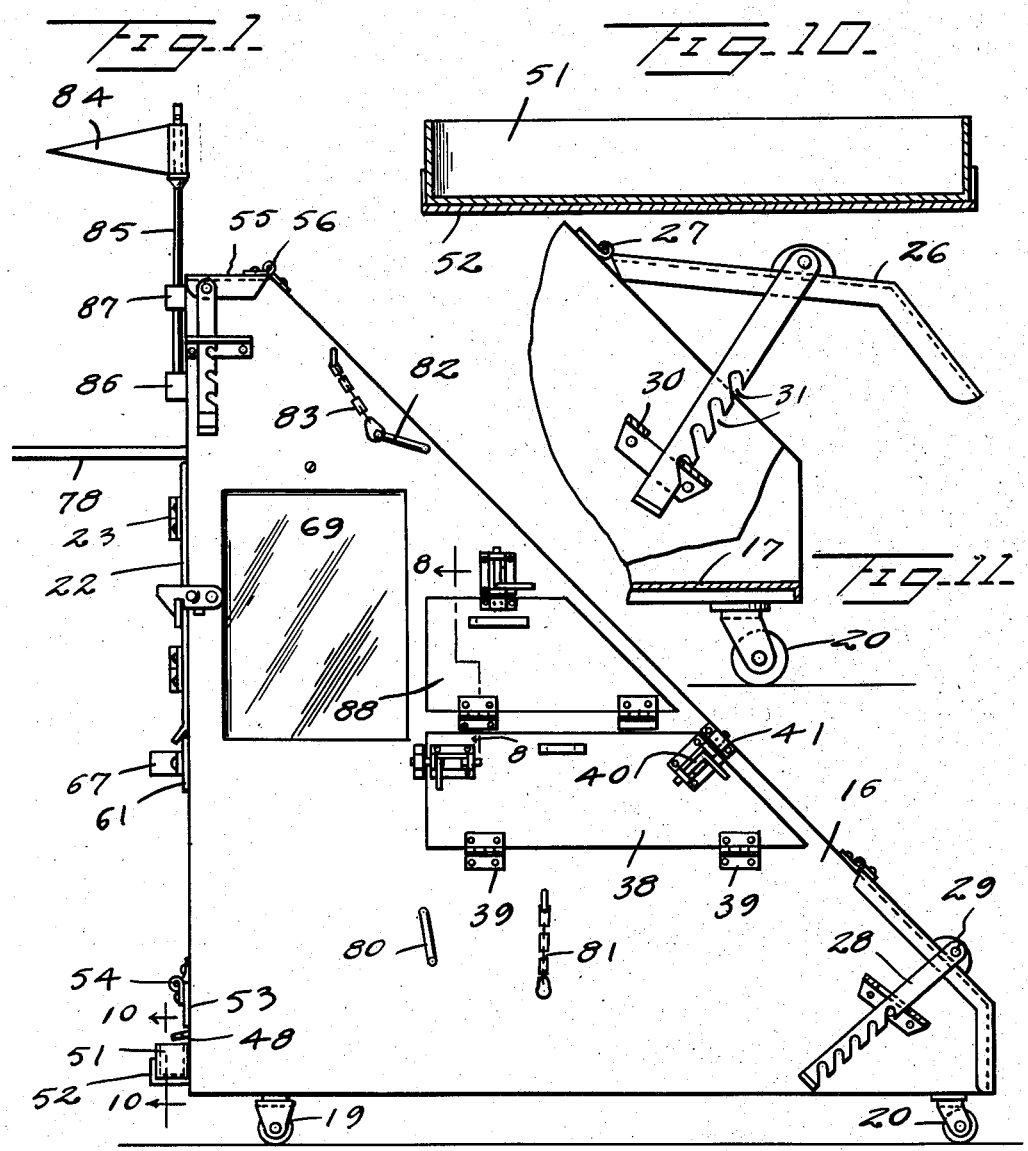

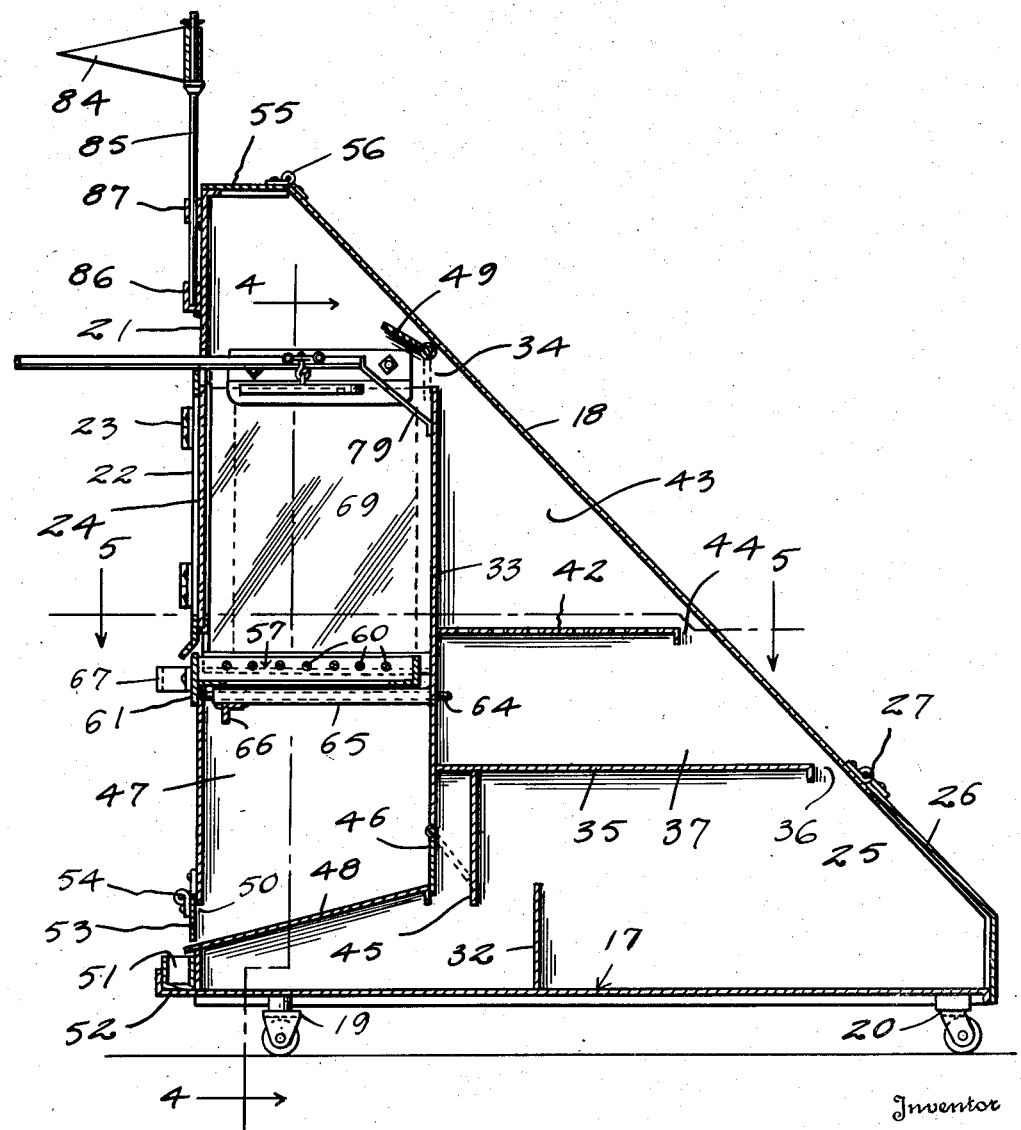

Aug. 29, 1950 L. D. TRELOAR 2,520,578
OVEN
Filed May 24, 1948 5 Sheets-Sheet 4
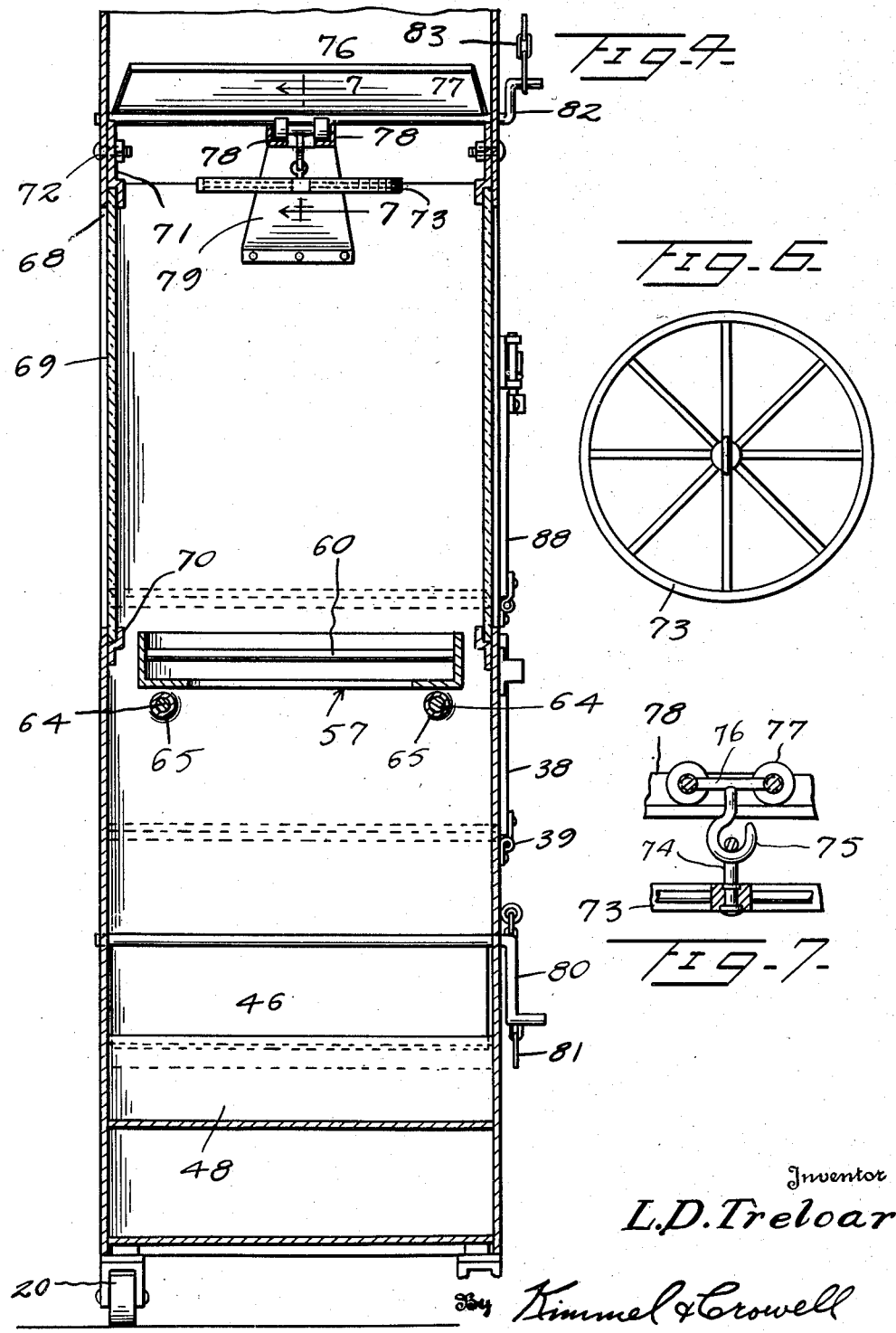

Aug. 29, 1950 L. D. TRELOAR 2,520,578
OVEN
Filed May 24, 1948 5 Sheets-Sheet 5
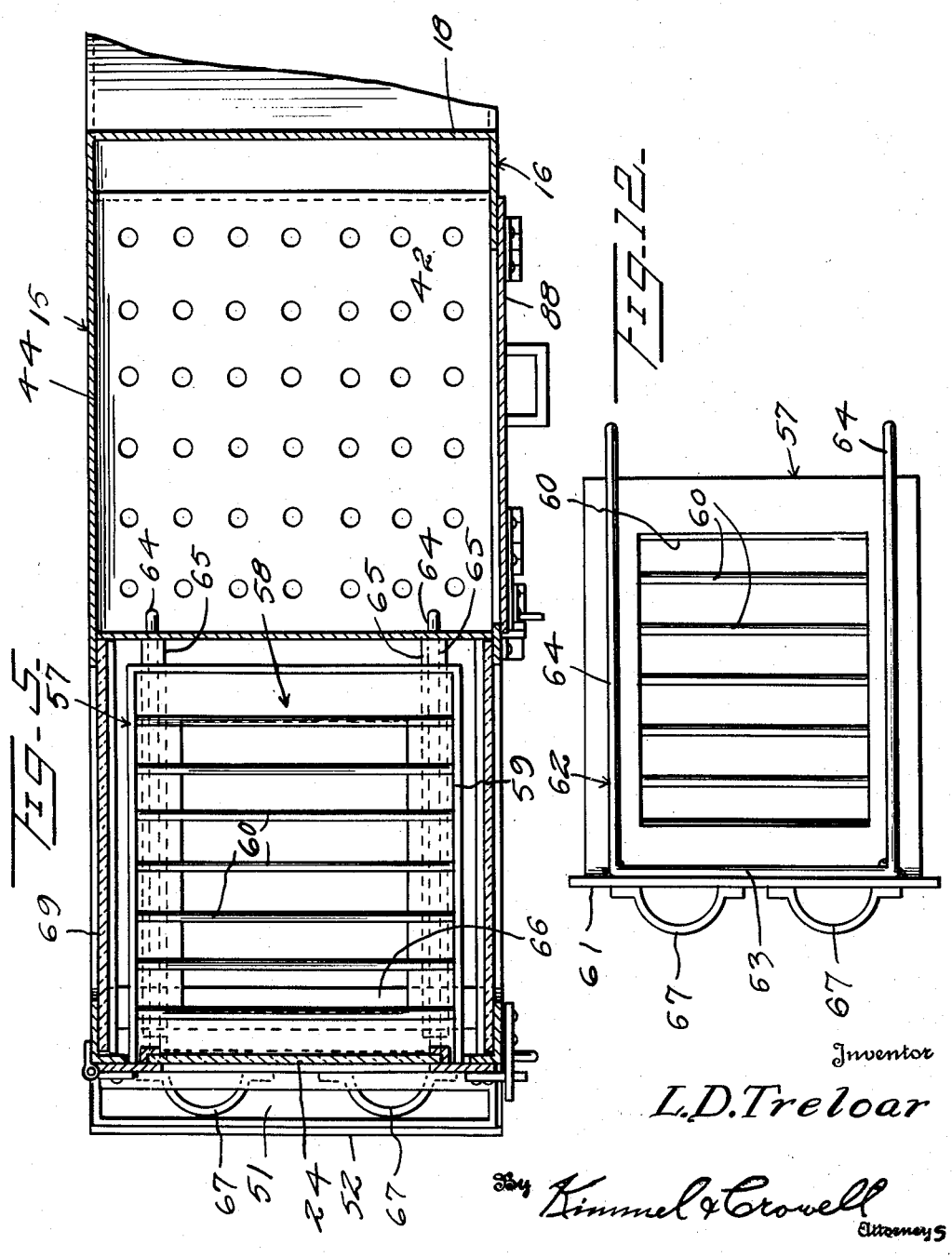
Inventor
L.D. Treloar
By Kimmel & Crowell
Attorneys Patented Aug. 29, 1950

2,520,578

UNITED STATES PATENT OFFICE 2,520,578

OVEN

Lester D. Treloar, Fort Dodge, Iowa

Application May 24, 1948, Serial No. 28,899

2 Claims. (Cl. 126—25)

This invention relates to barbecue ovens and is an improvement over the oven embodied in my copending application Serial No. 731,365, filed February 27, 1947, which issued as Patent No. 2,492,021, dated Dec. 20, 1949 for Oven.

An object of this invention is to provide a mobile oven structure for cooking a relatively large quantity of food at one time, particularly meats, the device also including at least two compartments or ovens wherein other foods may be cooked.

Another object of this invention is to provide an oven structure of this kind which is mounted on wheels and casters so that the device may be shifted to obtain the maximum draft.

A further object of this invention is to provide a mobile oven structure which can be shifted relative to the wind so that the air flowing past the device will form a suction so as to draw out the smoke and particles of combustion.

A further object of this invention is to provide a mobile oven structure which includes transparent panels in the barbecue portion of the device so that the condition of the meat can be determined from the exterior.

A further object of this invention is to provide a barbecue oven structure including a slidable grid-like support for holding pans receiving the drippings from the meat, and also including a lower inclined wall for guiding the overflow drippings into an outer receiver.

With the above and other objects in view, my invention consists in the arrangement, combination and details of construction disclosed in the drawings and specification, and then more particularly pointed out in the appended claims.

In the drawings:

Figure 1 is a detail side elevation of a barbecue oven constructed according to an embodiment of my invention, Figure 2 is a front elevation of the device, Figure 3 is a vertical section taken longitudinally through the device, Figure 4 is a fragmentary sectional view taken on the line 4—4 of Figure 3, Figure 5 is a fragmentary sectional view taken on the line 5—5 of Figure 3, Figure 6 is a plan view of the meat supporting wheel, Figure 7 is a fragmentary sectional view taken on the line 7—7 of Figure 4, Figure 8 is a fragmentary sectional view taken on the line 8—8 of Figure 1, Figure 9 is a fragmentary sectional view taken on the line 9—9 of Figure 8, Figure 10 is a sectional view taken on the line 10—10 of Figure 1, Figure 11 is a fragmentary side elevation, partly broken away and in section, showing the draft control means; and Figure 12 is a bottom plan view of the grease pan supporting grill.

Referring to the drawings, the numerals 15 and 16 designate generally a pair of upright side members and the numeral 17 designates a bottom member connected between the lower ends of the side members. The side members 15 and 16 are of substantially triangular configuration with one right angle side thereof lowermost and forming the base, and the other right angle side forming the front of the housing.

An inclined top wall 18 is connected between the side walls 15 and 16, being inclined upwardly and forwardly from the rear end of the bottom wall 17. The housing herein disclosed is movably mounted on a pair of front wheels 19, and a pair of rear caster wheels 20. A front wall 21 is secured between the side walls 15 and 16, and the front wall 21 has a door or closure 22 hinged as at 23, at a point between the upper and lower ends thereof and the door or closure 22 includes a transparent panel 24.

The housing includes a combustion chamber 25 in the lower portion thereof and an obtusely inclined draft regulating closure 26 is hingedly secured as at 27 to the lower portion of the top wall 18 and is adapted to regulate air entering the combustion chamber 25. The draft regulating closure 26, as shown in Figures 1 and 11, is adapted to be held in selected open position by means of a link 28 pivotally secured as at 29 to the closure 26, and the link 28 is slidable through a keeper 30 which is fixed to the side wall 16. The link 28 is formed with a plurality of notches 31 which are adapted to engage with the keeper 30 so that the closure 26 may thereby be held in selected open or closed position.

The inner end of the combustion chamber 25 is defined by an upright partition or baffle 32 which is fixed between the side walls 15 and 16 and bottom wall 17. A vertically disposed inner wall 33 is fixed between the side walls 15 and 16, being spaced at its upper end from the inner side of the top wall 18, thereby providing a passage 34. A horizontally disposed wall 35 is fixed between the side walls 15 and 16 and to the inner wall 33 and is spaced at its rear end from the top wall 18, thereby forming a space or flue 36. The wall 35 forms with the side walls and the top wall 18, together with the inner wall 33, a baking compartment or oven 37 within which food particles are adapted to be positioned for baking. The compartment or oven 37 has a closure 38 which is hinged as at 39 to the side wall 16, and the closure 39 which drops downwardly to a substantially open position is adapted to be locked in its closed position by means of a pair of bolts 40 engageable with keepers 41 secured to the side wall 16.

A perforate horizontal wall 42 is also fixed between the side walls 15 and 16 and to the inner wall 33, being spaced upwardly from the wall 35 so as to form a warming compartment 43. The rear end of the perforate wall 42 is spaced from the top wall 18 as indicated at 44 so that the heat, smoke or particles of combustion may pass upwardly along the inner surface of the top wall 18. A depending baffle or deflector 45 is fixed between the side walls 15 and 16 and to the lower side of the wall 35, with the lower edge of the baffle or deflector 45 extending downwardly below the upper edge of the baffle or deflector 32.

A pivoted damper 46 is disposed between the side walls 15 and 16 at the lower end of the inner wall 33 and is adapted to be disposed either in a vertical closed position or in the dotted position shown in Figure 3 wherein the heat and particles of combustion are directed upwardly and forwardly into a barbecue chamber 47. A downwardly and forwardly inclined wall 48 is fixed between the side walls 15 and 16 and forms the bottom wall of the barbecue chamber 47 with the damper 46 engageable with the rear edge of the wall 48 when the damper is in closed position. An upper damper 49 is pivotally mounted between the side walls 15 and 16 and is adapted to regulate the flow of smoke, heat and particles of combustion along the inner surface of the top wall 18. When the damper 49 is in a substantially vertical closed position damper 46 will be disposed in the dotted position shown in Figure 3.

The inclined wall 48 extends forwardly and downwardly, projecting through an opening 50 formed in the lower portion of the front wall 21 so that any grease or other particles which may drop onto the wall 48 will drain forwardly into a collecting tray 51 which is supported by an L-shaped supporting means 52 extending from the bottom wall 17. A closure 53 is hingedly secured as at 54 to the front wall 21 and is adapted to substantially close the opening 50 while leaving a slight space between the lower edge of the closure 53 and the draining wall 48 so that grease or the like may drain into the tray 51.

The wall 48 may be cleaned by raising the closure 53. An upper damper or regulator 55 is hingedly secured as at 56 to the upper end of the top wall 18 and is adapted to be raised to open position when the device is in operation. The barbecue chamber 47 has slidably mounted between the upper and lower ends thereof a tray supporting slide generally designated as 57. The slide 57 includes an angle frame 58 which has secured between the vertical sides 59 thereof a plurality of transverse grill bars 60. The slide 57 has fixed to the front wall 61 thereof a U-shaped member 62, the U-shaped member 62 being secured at its bight 63 to the inner side of the front wall 61. The parallel legs 64 of the U-shaped member 62 are slidable through guide tubes 65 which are fixed horizontally to the inner wall 13 and extend forwardly. The forward ends of the guide tubes 65 are fixed to a transversely disposed angle bar 66 which is secured between the side members 15 and 16.

The slide 57 has secured to the front wall 61 thereof a pair of looped handles 67 so that the slide 57 may be readily pulled outwardly with pans or other collectors resting on the bars 60. The side walls 15 and 16 are formed with openings 68 within which transparent panels 69 are mounted. The panels 69 engage in L-shaped channel forming members 70 secured to the inner sides of the side members 15 and 16 at the lower portions of the openings 68 and removable channel forming members 71 are secured by fastening means 72 to the upper portions of the side members 15 and 16. The meat which is to be barbecued in the chamber 47 above the slide 57 is suspendingly supported from a wheel 73 which has secured to the center thereof an eye 74. The eye 74 is engaged by a hook 75 carried by a carriage 76 and the carriage 76 has mounted thereon pairs of rollers 77 which engage L-shaped guide tracks or rails 78 fixed horizontally in the upper portion of the barbecue chamber 47. The track or rail 78 extends forwardly beyond the front wall 21, as shown in Figures 1 and 3 so that the wheel 73 may be loaded exteriorly of the chamber 47 and then moved inwardly, and after the meat has been cooked the wheel which is supported from the carriage formed by the shaft 76 and the rollers 77 may be pulled outwardly when the front door 22 has been opened.

The rear portion of the track or rail 78 is supported from a bracket 79 which is secured to the forward side of the inner wall 33 and projects upwardly and forwardly. The lower damper 46 has secured thereto a crank 80 disposed on the outer side of the wall 16 and the damper 46 may be held in barbecue position by means of a flexible holder 81 in the form of a chain or the like. The upper damper 49 also has secured to the outer end thereof a crank 82 and the damper 49 may be held in its open position by means of a chain 83. In order that the user of this device may be able to determine the wind direction so that the rear end of this device may be turned into the wind, I have provided a weather vane 84 which is pivotally mounted on a staff 85 and the staff 85 is supported from a socket 86 secured to the upper portion of the front wall 21. A bearing 87 is secured to the front wall 21 at a point above the socket 86. Both the staff 85 and the flag or vane 84 may rotate one relative to the other.

In the use and operation of this device, the combustion chamber 25 is adapted to receive wood, charcoal or the like which is burned in chamber 25. Regulator 26 is raised to a selected open position so that air will enter the combustion chamber 25 and if it is desired to only bake food in the chambers 37 and 43, damper 46 may be dropped to a vertical closed position, with damper 49 raised to the full line position shown in Figure 3. The smoke and products of combustion will flow upwardly through the passages 36 and 44 and 34 and then flow out through the top of the device, the upper closure 55 being at this time in raised position. In the event it is desired to cook meat in the barbecue chamber 47, damper 49 is dropped to a vertical closed position and damper 46 is swung rearwardly to engage baffle or deflector 45. The heat and products of combustion will thereupon flow over deflector 32, under deflector 45, and then into the lower portion of barbecue chamber 47. The slide member or drawer 57 may have pans or other collectors mounted thereon, and preferably these pans or collectors are round so that they will not entirely close off the passage between the lower portion of chamber and the upper portion thereof. The meat is suspendingly secured to the wheel 73 and the drippings of grease will drop into the pans or collectors mounted on the grill bars 60 of slide member 57.

The upper chamber 43 is closed by means of a door or closure 88 hinged to the side wall 16, and closure 88 is adapted to be held in a substantially horizontal open position by means of an elongated bar 89 pivotally secured as at 90 to the inner side of the closure 88. The bar 89 is slidable through a U-shaped guide 91 which is fixed to the rear side of inner wall 33 and the inner end of bar or link 89 is formed with a stop 92 engageable with the guide 91 when the closure 88 is in its open position. It will be understood that closure 38 has associated therewith a similar bar, to bar 89, with guide 91, for holding this closure in a horizontal open position.

By providing a barbecue structure as hereinbefore described, particularly with the inclined wall 18 which inclines upwardly from the rear end of the device, the rear end may be extended into the wind so that the air will be directed into the combustion chamber 25 and with the top wall 18 inclined upwardly and forwardly there will be formed a suction at the discharge end of the flue when the upper damper 55 is open.

I do not mean to confine myself to the exact details of construction herein disclosed but claim all variations falling within the purview of the appended claims.

What I claim is:

1. A barbecue oven comprising a housing formed of substantially triangular side walls having one right angular edge horizontal and the other right angular edge vertical, an inclined top wall secured to the inclined edges of said side walls, a bottom wall secured to said horizontal edges of said side walls, a front wall secured to said vertical edges, a lower draft regulating member hingedly carried by said top wall, an upper regulating member carried by the upper end of said top wall, a combustion chamber in the lower portion of said housing, a vertical inner wall in said housing fixed between said side walls forming a front barbecue chamber, a damper at the lower end of said vertical wall regulating the communication of said front chamber with said combustion chamber, a pair of inner horizontal walls above said combustion chamber defining a pair of baking chambers, said pair of inner walls being spaced at their rear edges from said top wall whereby products of combustion may flow upwardly along said top wall, a damper at the upper end of said vertical wall for regulating the flow of the products of combustion along said top wall, a wind direction indicator carried by said housing, and castor wheels secured to the bottom of said housing whereby said housing may be adjusted to dispose said lower regulating member facing the wind.

2. A barbecue oven comprising a housing formed of substantially triangular side walls having one right angular edge horizontal and the other right angular edge vertical, an inclined top wall secured to the inclined edges of said side walls, a bottom wall secured to said horizontal edges of said side walls, a front wall secured to said vertical edges, a lower draft regulating member hingedly carried by said top wall, an upper regulating member carried by the upper end of said top wall, a combustion chamber in the lower portion of said housing, a vertical inner wall in said housing forwardly of said combustion chamber forming a front barbecue chamber, a pair of inner horizontal walls fixed said side walls and fixed to said inner vertical wall, the rear edges of said pair of walls being spaced from said top wall whereby to provide a flue, a damper at the upper end of said inner vertical wall for regulating the passage of products of combustion through said flue, oppositely disposed vertical baffles at the forward end of said combustion chamber, and a lower damper at the lower end of said inner vertical wall for regulating the passage of heat and products of combustion into said barbecue chamber, a wind direction indicator carried by said housing, and castor wheels secured to the bottom of said housing whereby said housing may be adjusted to dispose said lower regulating member facing the wind.

LESTER D. TRELOAR.

REFERENCES CITED

The following references are of record in the file of this patent:

UNITED STATES PATENTS

| Number | Name | Date |
|---|---|---|
| 521,718 | Koll | June 19, 1894 |
| 957,748 | Coppridge | May 10, 1910 |
| 1,127,064 | Mills | Feb. 2, 1915 |
| 2,109,796 | Hirschenfeld | Mar. 1, 1938 |
| 2,212,015 | Dugan | Aug. 20, 1940 |
| 2,350,948 | Walker | June 6, 1944 |